R. P. Buttles,

Cage Trap,

Nº 26,883. Patented Jan. 24, 1860.

Witnesses
E. P. Smith
Chas. B. Burch

Inventor
R. P. Buttles
by his attorney
J. Southgate Smith

UNITED STATES PATENT OFFICE.

R. P. BUTTLES, OF MANSFIELD, PENNSYLVANIA.

ANIMAL-TRAP.

Specification of Letters Patent No. 26,883, dated January 24, 1860.

*To all whom it may concern:*

Be it known that I, R. P. BUTTLES, of Mansfield, Tioga county, Pennsylvania, have invented certain new and useful Improvements in Animal-Traps, of which the following is a full, clear, and exact description, reference being had to the accompanying drawing, forming part of this specification, in which—

Figure 1:
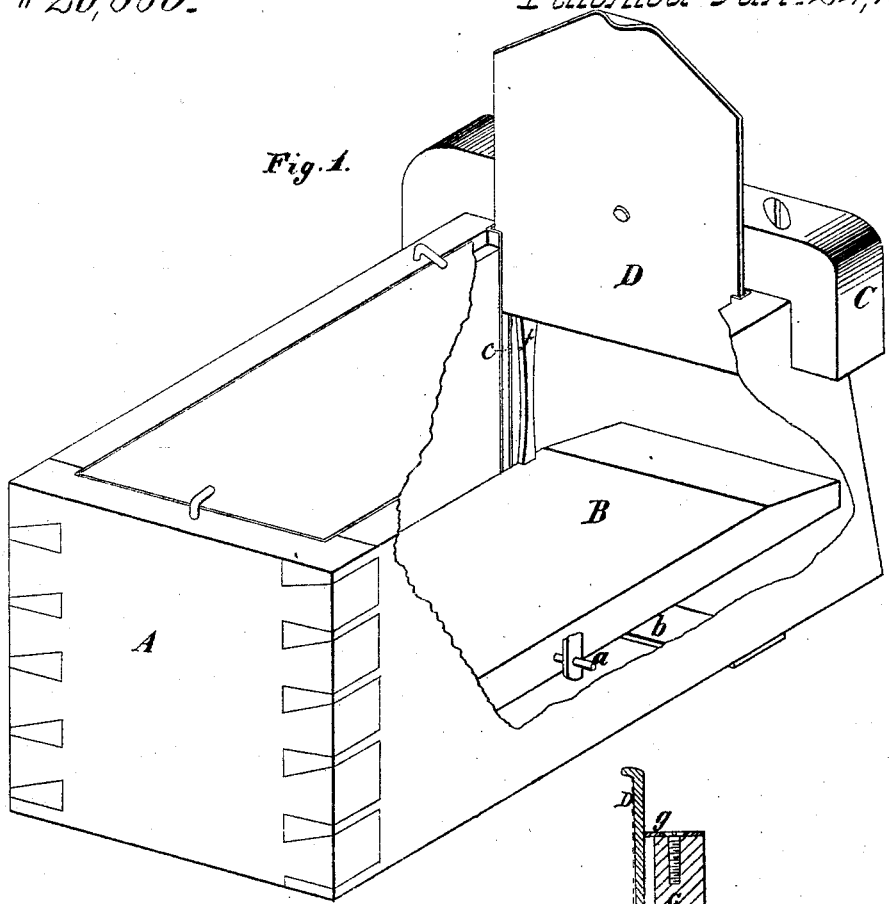
Figure 2:
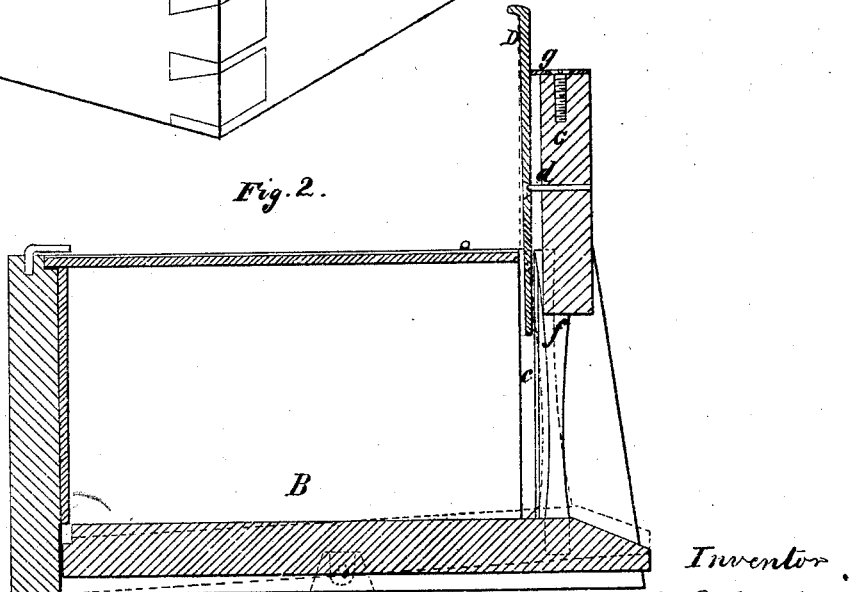

Figure 1, represents a perspective view of a trap inclosing my improvements with the door raised. Fig. 2, represents a longitudinal sectional elevation of the same showing the arrangement of the mechanism for springing the trap.

The first part of my invention consists in so arranging the bottom of the trap in connection with vertical rods extending upward from the bottom that the tipping of the bottom caused by the entrance of the animal will release the door and close the trap.

The second part of my invention consists in arranging the points of suspension of the bottom of the trap in such position as to require the animal to pass entirely within the trap before it will tip and cause the door to be closed.

This trap consists of a rectangular box (A) which may be divided into one or more compartments each forming a distinct trap. The bottom (B) of the trap is suspended upon pivots (a) at such distance from the front end that, that end will preponderate and rest immovably upon the floor or upon a brace (b) extending across the trap, while the animal enters, and also so that it is necessary that the animal should pass entirely within and beyond the center of the trap before its weight will cause the bottom to tip and spring the trap. A cross bar (C) unites the sides of the trap at the front end and rises a sufficient distance above the top to give support to a sliding door (D) when raised. This door is arranged to slide in grooves (c) in the sides of the trap, and when raised is supported by a small pin or catch (d) projecting from the front bar and passing through a hole in the door. To the tilting bottom and just in front of the door is attached two upright bars (f), one on either side. These bars extend just above the lower edge of the door when raised, and are operated by the tipping down of the rear end of the bottom of the trap, caused by the entrance of the animal. As these upright bars are thrown back by the tipping of the bottom of the trap they strike the lower edge of the door and throw it off of the pin or catch by which it is held when raised. The door when released slides in its grooves (c), closes the mouth of the trap, and prevents the escape of the animal. An adjustable slide or button (g) is attached to the top of the cross bar, and by means of this button the adjustment of the hold of the door on the pin is regulated so that the trap may be sprung with greater or less ease. At the back of the trap is placed a reflector for the purpose of reflecting the bait, of giving the appearance of greater length to the trap, and also the appearance of an opening outward from its rear end.

Having thus described my improvements in animal traps what I claim therein as new and desire to secure by Letters Patent is—

1. The combination of the tipping bottom, the vertical rods and the sliding door, arranged substantially as described for the purpose as set forth.

2. I also claim arranging the points of suspension of the tipping bottom in such position as to require the animal to enter entirely within the trap before it is sprung.

In testimony whereof I have subscribed my name.

R. P. BUTTLES.

Witnesses:
H. G. MARTIN,
C. J. FULLER.